Nov. 22, 1938.  B. GASPAR  2,137,336
METHOD OF PRODUCING COLORED COLLOID LAYERS FOR PHOTOGRAPHIC
PURPOSES AND MATERIAL THEREFOR
Filed June 20, 1936
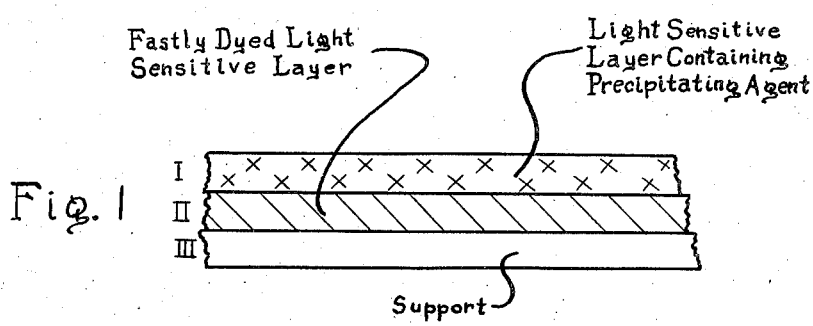
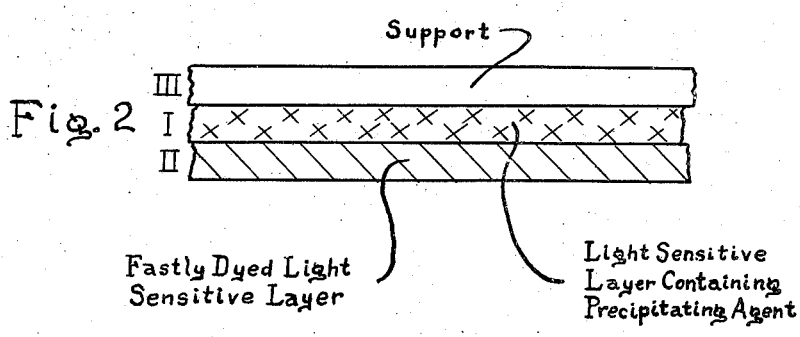
Bela Gaspar INVENTOR
BY
F. Gerald Toye
ATTORNEY Patented Nov. 22, 1938

2,137,336

UNITED STATES PATENT OFFICE 2,137,336

METHOD OF PRODUCING COLORED COLLOID LAYERS FOR PHOTOGRAPHIC PURPOSES AND MATERIAL THEREFOR

Bela Gaspar, Brussels, Belgium

Application June 20, 1936, Serial No. 86,427
In Germany June 21, 1935

13 Claims. (Cl. 95—2)

For many purposes in connection with photographic and color photographic processes it is necessary to produce colored gelatine layers, the color of which does not bleed or, in the case of a plurality of layers, diffuse from one colored layer into an adjacent layer which may be either colorless or may be differently colored. It has been proposed to mordant the dyestuffs used for dyeing the gelatine by treating the layer after dyeing with metal salts. It has also been proposed to precipitate the dyestuff within the emulsion prior to pouring. Furthermore for the same purpose it is known to cause mutual precipitation of dyestuffs of contrary reaction or to effect double decomposition of dyestuffs and precipitating agents, a difficultly soluble salt of the dyestuff being formed by this double decomposition. Diffusion of the dyestuffs present in adjacent layers of a multilayer material has been prevented by the formation in the boundary zone of such layers of an extremely dispersed dyestuff precipitate produced by mutual precipitation of the dyestuffs contained in each of the layers or of one dyestuff contained in one of the layers and a colorless precipitating agent present within the other layer.

Applicant has discovered, contrary to what might be expected, that such dyestuff precipitates in the boundary zone are no obstacle to diffusion of dyestuffs from aqueous solution through the boundary zone into the deeper strata of the gelatine. Even with thick layers of gelatine, containing a precipitating agent and in which a very finely dispersed dyestuff precipitate is formed by treating with aqueous dyestuff solution, there is no difficulty for complete dyeing of the gelatine.

For example, it has been found, that a gelatine layer containing diphenyl-guanidine acetate allows penetration of a solution of 1% strength of Diamine Pure Blue (Schultz Farbstofftabellen 5th Ed. No. 426). An insoluble diphenyl-guanidine salt is formed at the surface of the layer, but nevertheless the penetration of the dissolved dyestuff is not inhibited and further quantities of the dyestuff are precipitated within the deeper strata of the gelatine. When interrupting the treatment with the solution of the blue dyestuff and continuing for example with a solution of Xylene Light Yellow 2G (Schultz, l. c. No. 22) the deepest stratum of the gelatine will be dyed yellow. These phenomena may be used for dyeing and especially selectively dyeing of gelatine layers for photographic purposes which layers may contain light-sensitive silver salts or already exposed and developed silver images.

According to the invention the gelatine layers to be colored by a water-insoluble precipitate of water-soluble dyestuffs are produced by adding the precipitating agent to the gelatine either before pouring the same or to the layer coated on a support, and applying thereafter an aqueous solution of the dyestuff to the coating. The addition of the precipitating agent to the gelatine or emulsion prior to coating is preferable if it is desired to have a distinct amount of dyestuff precipitated within the layer, as the quantity of precipitating agent determines to a great extent the quantity of dyestuff fixed, especially if dyestuffs are used which by themselves do not dye the gelatine. Sometimes it may be desirable to add the precipitating agent only after pouring the layer and then a solution of the precipitating agent may be applied prior to the treatment with the dyestuff solution.

The addition of the precipitating agent to the gelatine or gelatine-layer and the subsequent dyeing with a dyestuff, which is precipitated by the agent present within the layer, may be used for selectively dyeing a plurality of layers poured one on top of the other or for dyeing different strata of a single layer. Even a layer not situated at the surface of a multilayer-material can be selectively dyed and the coloration so obtained does not diffuse or bleed. Therefore the exposure of the part-layers of a multi-layer light-sensitive material may occur while these layers are colorless and the dyestuffs necessary for the color reproduction may be applied after exposure. Thereafter the dyestuffs uniformly applied to and precipitated within the layers or part-layers may be locally destroyed at the exposed or unexposed parts of the layer by the use of the well-known dyestuff destroying processes. A plurality of superimposed layers may be dyed a different color, either by using in each layer a precipitating agent which only precipitates one of the two different dyestuffs, or by using two dyestuff solutions in succession, of which solutions the second forms a dyestuff deposit in the deepest part-layer, in which the precipitating agent is still present, whereas the superimposed layer is unaffected, the precipitating agent having been already consumed by the first treatment with the dyestuff solution. When using a plurality of precipitating agents the agent for the deeper layer is applied to the gelatine or emulsion prior to coating. The precipitating agent for the top-layer may be applied after dyeing the deeper layer and the second dyestuff solution is applied thereafter.

*Example 1.*—A solution of 5 g. gelatine in 80 ccm. water is mixed with a solution of 1 g. betanaphthoquinolinium-N-ethyl sulphate and poured on to a support. The layer is treated with an aqueous solution of 1% strength of Diamine Pure Blue FF (Schultz, l. c. No. 424).

*Example 2.*—A layer as described in Example 1 is treated with a solution of ½% strength of Diamine Fast Red F (Schultz l. c. No. 343). The layer is used as an antihalation layer, a light sensitive emulsion being applied after drying of the colored layer.

*Example 3.*—A silver-bromide gelatine emulsion is colored yellow by adding 2-phenyl-4-aminoquinolin hydrochloride and Metanil Yellow (Schultz l. c. No. 134). The emulsion is a sensitized emulsion, containing pinacyanol. After coating a colorless silver bromide gelatine emulsion containing 3 g. diphenyl-guanidin-acetate per sq. m. is coated on top of the yellow layer. After exposure and development and fixing the film is treated by a solution of 1% strength of Diamine Pure Blue FF.

*Example 4.*—On to a yellow layer as described in Example 3 a colorless silver halide emulsion without the addition of a precipitating agent is poured. After exposure development and fixing a solution of 3% strength of betanaphthoquinolinium-N-ethyl sulphate is applied and the film is treated for about 10 minutes. Thereafter a dyestuff solution, as described in Example 3, is used for dyeing during about 4 minutes. The film then shows a blank silver image in the yellow dyed layer and a silver image in the blue dyed layer. The silver images are treated with a solution of 5% thiocarbamide and 1% citric acid which, in a known manner, destroys the dyestuffs at the points where silver is present.

The film described may be used as a front film of a bipack, the rear film being a colorless or colored film sensitive for green. In this case the blue sensitive layer of the double coated film faces the objective in the camera during exposure.

*Example 5.*—A silver bromide gelatine emulsion is dyed with chlorantinlichtgelb, (a dyestuff furnished by the Gesellschaft für Chemische Industrie, Basel, Switzerland) the dyestuff being precipitated by barium nitrate. The emulsion is poured on a support and on top of the yellow layer a colorless silver bromide gelatine emulsion containing 3 g. of cinchonine hydrochloride per sq. m. is poured. The yellow layer may contain a sensitizer for red light or for green light, the top layer being an ordinary blue-sensitive emulsion layer. After exposure the surface layer is treated with a solution of 1% strength of Diamine Pure Blue or with a solution of Diamine Fast Pink BBF. The film is then developed and fixed and the dyestuff destroyed by a thiocarbamide solution at the points where silver is present.

*Example 6.*—A silver halide emulsion containing 0.3% of the sodium salt of salicylic acid is poured on to a support of Celluloid. On top of this colorless layer a layer is poured containing Diamine Pure Blue precipitated by triphenylguanidine acetate. The composite film is treated after exposure by an aqueous solution of ¼% strength of auramine (Schultz l. c. 493) and washed in water until the upper layer has become pure blue. The film as a whole appears green.

Instead of the dyestuffs used in the preceding examples other dyestuffs may be used which are precipitated by the precipitating agent contained in the layer. For dyeing of the deeper layers dyestuffs are used which do not dye the upper layer already colored but can be removed from the upper layer by washing. For dyeing of the surface layer acid and substantive dyestuffs are preferred and therefore precipitating agents are used which form insoluble salts by double decomposition with acid or substantive dyestuffs. There may be used, for example, the salts of organic bases, such as naphthoquinoline, triphenyl-guanidine, quinine, cinchonine, aminoquinoline. The salts formed by these bases with organic acids or the quaternary salts derived from the amines may be used. Other precipitating agents which may be used are inorganic bases or salts, such as barium carbonate or magnesium carbonate. For the precipitation of basic dyestuffs, such as chrysoidine (Schultz l. c. 33) or Janus-red-B (Schultz l. c. 240) antimony salts or zinc-ferrocyanide may be used or acids, such as tannic acids which form insoluble salts with basic dyestuffs. The amount of the precipitating agent and the sequence may be chosen according to the properties of dyestuff and precipitating agent or the desired result.

Instead of the dyestuff solutions described there may be used solutions which do not contain a dyestuff itself, but which form a dyestuff by interaction with dyestuff-forming substances present in the material. For example, a layer may be used which contains a leuco-derivative of a vat-dyestuff and a precipitating agent for the vat-dyestuffs. When such a layer is treated with an oxidizing agent the dyestuff is precipitated in situ by the precipitating agent and there is no possibility for bleeding or diffusion of the dyestuff.

*Example 7.*—A silver bromide gelatine emulsion which contains 20 g. silver bromide in one liter of emulsion and sensitized to red light with pinacyanol is coated onto a support of Celluloid.

To this emulsion is added before the coating operation either:

A. 5 g. of the beta-naphthothiazolium salt of diazo light yellow G dissolved in 100 cc. alcohol; or B. 5 g. of the beta-naphthoquinolinium-salt of 7-, 7-, dioxy- 2-, 2'- dinaphthylurea 5-, 5' disulfonic acid dissolved in 100 cc. alcohol; or C. 5 g. of the cinchonin salt of the sulfuric acid ester of leucohexabromindigo.

On top of the first layer another colorless silver-bromide emulsion is coated which contains 2 g. diphenylquanidin acetate in a liter of emulsion. This emulsion may be sensitized to green light.

The film is thereafter exposed in a camera or in a printing machine, and subsequently developed and fixed in the usual manner.

After that the film is treated by immersing it into an aqueous solution containing either:

I. Diamine Pure Blue FF (Schultz l. c. No. 424); or

II. 1% solution of the sodium salt of the sulfuric acid-ester of leucodibrombisthionaphthenindigo.

The dyestuff in the deeper layer is formed diffusely if using a film according to Example A by diazotizing with a 1% solution of nitrous acid and subsequent coupling with a solution of naphthylaminchlorhydrate. Thus a red azo-dyestuff is formed.

Using a film as described in Example B by treating the film with a 0.5% solution of hydrobromic acid and sodium bichromate.

The above described treatment refers to the forming of dyestuffs in the deeper layer.

The further treatment of the film indicated in this Example AI and BI is continued in the same way as in Example 4 indicated with an acidic solution of thiocarbamide thus a two-color image is formed by local dye destruction of the dyestuff in each layer.

The film as made according to this Example C and treated as in this example under II indicated is treated with a 1% solution of hydrochloric acid and sodium bichromate and thus a two-color image is formed.

In the deeper layer a blue and in the upper layer a red image is formed locally.

It is already known to have a precipitating agent within a layer to be printed upon, but in this case only the small amounts of dyestuff of the matrix are transferred locally to the layer. In the present process the dyestuff is uniformly applied from aqueous solutions and by the presence of precipitating agents determination of the amount of dyestuff and the selective dyeing of different strata of the material is rendered possible.

In the annexed drawing Figure 1 shows two differently sensitized silver halide layers I and II coated on to a support III.

Figure 2 shows two differently sensitized silver halide layers II and I on a support III. In each case layer I is uncolored and contains a precipitating agent for the dyestuff to be applied afterwards. Layer II is a colored layer. The layers containing the precipitating agent for the dyestuff to be applied afterwards may contain a dyestuff which is not precipitated by the precipitating agent, but only acts as a filter dye during exposure and can be washed out after exposure, if desired.

What I claim is:

1. The method of producing a colored photographic image in a colloid layer of a photographic material including a light sensitive silver halide, which comprises incorporating in the colloid to be colored prior to exposure of the photographic material to light, a precipitating agent adapted to react with the dyestuff to be used in coloring the said colloid, said precipitating agent being such as will not be adversely affected by ordinary photographic treating baths, exposing said material to light to form a silver image therein, treating the layer throughout its depth after exposure, with an aqueous solution of said dyestuff to form a dyestuff precipitate only in said layer and treating said layer with a dyestuff destroying bath which destroys the dyestuff locally in proportion to the silver image in said layer.

2. The method of producing a colored photographic image in a gelatine layer of a photographic material, which comprises incorporating in a light sensitive silver halide gelatine emulsion used to form said layer, prior to exposure to light, a precipitating agent adapted to react with the dyestuff to be used in coloring said layer, said precipitating agent being such as will not be adversely affected by ordinary photographic treating baths, exposing said layer to light to form a silver image therein; treating the layer throughout its depth after exposure, with an aqueous solution of said dyestuff to form a dyestuff precipitate only in said layer and treating said layer with a dyestuff destroying bath which destroys the dyestuff locally in proportion to the silver image in said layer.

3. The method of producing a colored photographic image in a gelatine layer of a photographic material, which comprises incorporating in a light sensitive silver halide emulsion, a precipitating agent adapted to react with the dyestuff to be used in coloring said layer, said precipitating agent being such as will not be adversely affected by ordinary photographic treating baths, pouring said silver halide gelatine emulsion having said precipitating agent incorporated therein to form a layer, exposing said layer to light to form a silver image therein, treating the layer throughout its depth after exposure, with an aqueous solution of said dyestuff to form a dyestuff precipitate only in said layer and treating said layer with a dyestuff destroying bath which destroys the dyestuff locally in proportion to the silver image in said layer.

4. The method of producing a colored photographic image in a gelatine emulsion layer of a multi-layer light sensitive silver halide material, which comprises incorporating in said layer prior to exposure of said material to light, a precipitating agent adapted to react with the dyestuff to be used in coloring said layer, said precipitating agent being such as will not be adversely affected by ordinary photographic treating baths, exposing said material to light to form a silver image, treating said material after exposure with an aqueous solution of said dyestuff to form a dyestuff precipitate only in said layer and treating said material with a dyestuff destroying bath which destroys the dyestuff locally in proportion to the silver image in said material.

5. The method of producing a colored photographic image in a gelatine emulsion layer of a multi-layer light sensitive photographic material, which comprises incorporating in a light sensitive silver halide emulsion a precipitating agent adapted to react with the dyestuff to be used in coloring said layer, said precipitating agent being such as will not be adversely affected by ordinary photographic treating baths, pouring said silver halide gelatine emulsion having said precipitating agent incorporated therein to form a layer along with the other layers of said material, exposing said material to light to form a silver image therein, treating said material after exposure with an aqueous solution of said dyestuff to form a dyestuff precipitate only in said layer and treating said material with a dyestuff destroying bath which destroys the dyestuff locally in proportion to the silver image in said material.

6. The method of producing a colored photographic image in the layers of a multi-layer light sensitive silver halide material comprising a predyed layer and a layer to be colored, which comprises incorporating in the gelatine of the layer to be colored prior to exposure of said material to light, a precipitating agent adapted to react with the dyestuff to be used in coloring said layer, said precipitating agent being such as will not be adversely affected by ordinary photographic treating baths, exposing said material to light to form silver images therein, treating said material after exposure with an aqueous solution of said dyestuff to form a dyestuff precipitate only in said layer to be colored and treating said material with a dyestuff destroying bath which destroys the dyestuff locally in said layers in proportion to the silver images in said material.

7. The method of producing a colored photographic image in the layers of a multi-layer light sensitive silver halide material comprising a predyed layer and a layer to be colored, which comprises incorporating in the gelatine of the layer to be colored prior to exposure of said material to light, a basic precipitating agent adapted to react with an acid dyestuff to be used in coloring said layer, said precipitating agent being such as will not be adversely affected by ordinary photographic treating baths, exposing said material to light to form silver images therein, treating said material after exposure with an aqueous solution of said dyestuff to form a dyestuff precipitate only in said layer to be colored and treating said material with a dyestuff destroying bath which destroys the dyestuff locally in said layers in proportion to the silver images in said material.

8. The method of producing a colored photographic image in the layers of a multi-layer light sensitive silver halide material comprising a predyed layer and a layer to be colored, which comprises incorporating in the gelatine of the layer to be colored prior to exposure of said material to light, a precipitating agent comprising a salt of an organic base adapted to react with an acid dyestuff to be used in coloring said layer, said precipitating agent being such as will not be adversely affected by ordinary photographic treating baths, exposing said material to light to form silver images therein, treating said material after exposure with an aqueous solution of said dyestuff to form a dyestuff precipitate only in said layer to be colored and treating said material with a dyestuff destroying bath which destroys the dyestuff locally in said layers in proportion to the silver images in said material.

9. The method of producing a colored photographic image in the layers of a multi-layer light sensitive silver halide material comprising a predyed layer and a layer to be colored, which comprises incorporating in the gelatine of the layer to be colored prior to exposure of said material to light, a precipitating agent comprising an acid adapted to react with a basic dyestuff to be used in coloring said layer, said precipitating agent being such as will not be adversely affected by ordinary photographic treating baths, exposing said material to light to form silver images therein, treating said material after exposure with an aqueous solution of said dyestuff to form a dyestuff precipitate only in said layer to be colored and treating said material with a dyestuff destroying bath which destroys the dyestuff locally in said layers in proportion to the silver images in said material.

10. The method of producing a colored photographic image in a layer of a multi-layer light sensitive silver halide material comprising a layer colored by a dyestuff resistant to ordinary photographic treating baths coated on top of a gelatine layer to be colored, which comprises incorporating in the gelatine of the layer to be colored prior to exposure of said material to light, a precipitating agent adapted to react with the dyestuff to be used in coloring said layer, said precipitating agent being such as will not be adversely affected by ordinary photographic treating baths, exposing the multi-layer material to light to form silver images therein, developing and fixing said silver images, treating said material after exposure with an aqueous solution of said dyestuff to form a dyestuff precipitate only in said layer to be colored, washing out the excess of said dyestuff from said material and treating said material with a dyestuff destroying bath which destroys the dyestuff locally in said layers in proportion to the silver images in said material.

11. The method of producing multi-color photographic images which comprises incorporating in at least one layer of a multi-layer light sensitive silver halide material, prior to exposure of said material to light, a precipitating agent adapted to react with the dyestuff to be used in coloring said layer, said precipitating agent being such as will not be adversely affected by ordinary photographic treating baths, exposing said material to light to form metallic silver images therein, applying an aqueous solution of said dyestuff to said material to produce a uniformly dyed silver image in said layer and treating said material with a dyestuff destroying bath which locally destroys the dyestuff in said layer in proportion to the metallic silver image therein.

12. A multi-layer photographic material comprising a predyed silver halide layer sensitized to a predetermined spectral range and a substantially colorless silver halide layer sensitized to a different spectral range, said substantially colorless layer having incorporated therein a dyestuff precipitating agent selected from the group consisting of organic bases and salts of such bases which will not be adversely affected by ordinary photographic treating baths.

13. A multi-layer photographic material comprising a substantially colorless silver halide layer containing a dye-forming substance and sensitized to a predetermined spectral range, and a substantially colorless silver halide layer sensitized to a different spectral range, said substantially colorless layer having incorporated therein a dyestuff precipitating agent selected from the group consisting of organic bases and salts of such bases which will not be adversely affected by ordinary photographic treating baths.

BELA GASPAR.